United States Patent
Kani et al.

(10) Patent No.: US 10,871,990 B2
(45) Date of Patent: Dec. 22, 2020

(54) EFFECTIVE SYNCHRONOUS COMMUNICATION OF SCREEN INFORMATION SHARED AMONG INFORMATION PROCESSING APPARATUSES

(71) Applicant: FUJITSU LIMITED, Kawasaki (JP)

(72) Inventors: Junya Kani, Kawasaki (JP); Junichi Yura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 80 days.

(21) Appl. No.: 16/223,172

(22) Filed: Dec. 18, 2018

(65) Prior Publication Data

US 2019/0205165 A1 Jul. 4, 2019

(30) Foreign Application Priority Data

Dec. 28, 2017 (JP) ................. 2017-254759

(51) Int. Cl.
*G06F 9/48* (2006.01)
*G06F 3/14* (2006.01)
(Continued)

(52) U.S. Cl.
CPC .......... *G06F 9/4881* (2013.01); *G06F 3/1454* (2013.01); *G06F 9/546* (2013.01);
(Continued)

(58) Field of Classification Search
CPC ............ G06F 3/1454; G06F 8/48; G09G 5/14
See application file for complete search history.

(56) References Cited

U.S. PATENT DOCUMENTS

| 8,453,148 B1 | 5/2013 | Hobbs |
| 2006/0150108 A1* | 7/2006 | Adachi ............... G09G 5/14 715/750 |

(Continued)

FOREIGN PATENT DOCUMENTS

| JP | 11-272591 | 10/1999 |
| JP | 2007-058644 | 3/2007 |
| WO | 2012/056727 | 5/2012 |

OTHER PUBLICATIONS

S. Izadi et al., "Dynamo: A public interactive surface supporting the cooperative sharing and exchange of media", In Proc. of UIST' 2003 ACM, pp. 159-168 (10 pages).

(Continued)

*Primary Examiner* — Tuan C Dao
(74) *Attorney, Agent, or Firm* — Fujitsu Patent Center

(57) ABSTRACT

An apparatus shares a common displaying space with other apparatuses, and stores a priority with which data is to be transmitted, in association with an application which operates using each window displayed on the common displaying space. In response to updating of data by each application, the apparatus performs transmission and reception of updated data generated by the application. Upon reception of first updated data generated by a first application, the apparatus changes, based on proximity between a first window of the first application and a second window of a second application, a second priority that is stored in association with the second application. When second updated data is generated by the second application that operates using the second window displayed on the apparatus, the apparatus determines, based on the changed second priority, a turn in order of transmission of the second updated data.

5 Claims, 22 Drawing Sheets

(51) Int. Cl.
*G06F 9/54* (2006.01)
*G09G 5/14* (2006.01)
*G09G 5/12* (2006.01)

(52) U.S. Cl.
CPC ............... *G09G 5/12* (2013.01); *G09G 5/14* (2013.01); *G09G 2350/00* (2013.01); *G09G 2370/022* (2013.01); *G09G 2370/20* (2013.01)

(56) References Cited

U.S. PATENT DOCUMENTS

| | | | |
|---|---|---|---|
| 2007/0237077 A1* | 10/2007 | Patwardhan | H04L 47/2433 370/230 |
| 2010/0299364 A1* | 11/2010 | Baldwin | G06F 3/0482 707/797 |
| 2011/0022974 A1* | 1/2011 | Kinoshita | H04M 1/72583 715/764 |
| 2013/0013743 A1 | 1/2013 | Sasakura et al. | |
| 2016/0364127 A1* | 12/2016 | Naegelkraemer | H04M 3/563 |
| 2017/0031543 A1 | 2/2017 | Numakami | |
| 2018/0253163 A1* | 9/2018 | Berger, Jr. | G06F 3/048 |

OTHER PUBLICATIONS

EESR—Extended European Search Report dated May 28, 2019 issued for European Patent Application No. 18213821.4. ** Reference US2013/013743A1 was previously submitted in the IDS filed on Dec. 18, 2018.

* cited by examiner

FIG.4

| WINDOW IDENTIFIER | W001 | ... |
|---|---|---|
| APPLICATION IDENTIFIER | A001 | ... |
| DISPLAY INFORMATION | {x:0,y:0,width:200,height:300} | ... |
| LAST UPDATE TIME | 2017-11-28T00:11:22:000 | ... |

| DATA IDENTIFIER | D0001 | ... |
|---|---|---|
| DATA | {abc:def} | ... |
| UPDATER | Kani | ... |
| UPDATE TIME | 2017-11-28T00:11:22:000 | ... |

FIG.6

| APPLICATION IDENTIFIER | A001 | ... |
|---|---|---|
| CONTENT | {ghi:jkl,...} | ... |
| ORIGIN | Example.com | ... |
| CATEGORY | Text-editor | ... |

| PRIORITY MAP IDENTIFIER | A001 | A002 | A003 | A004 | ... |
|---|---|---|---|---|---|
| PRIORITY | 500 | 102 | 8075 | 35 | ... |

FIG.8

| DATA IDENTIFIER | D0001 |
|---|---|
| APPLICATION IDENTIFIER | A001 |
| TRANSMISSION REQUEST TIME | 2017-11-28T00:11:22:000 |

FIG.9

| DATA IDENTIFIER | D0001 |
| --- | --- |
| DESTINATION | Tanaka |
| APPLICATION IDENTIFIER | A001 |
| DATA | {abc:def} |
| TRANSMISSION TIME | 2017-11-28T00:11:22:500 |

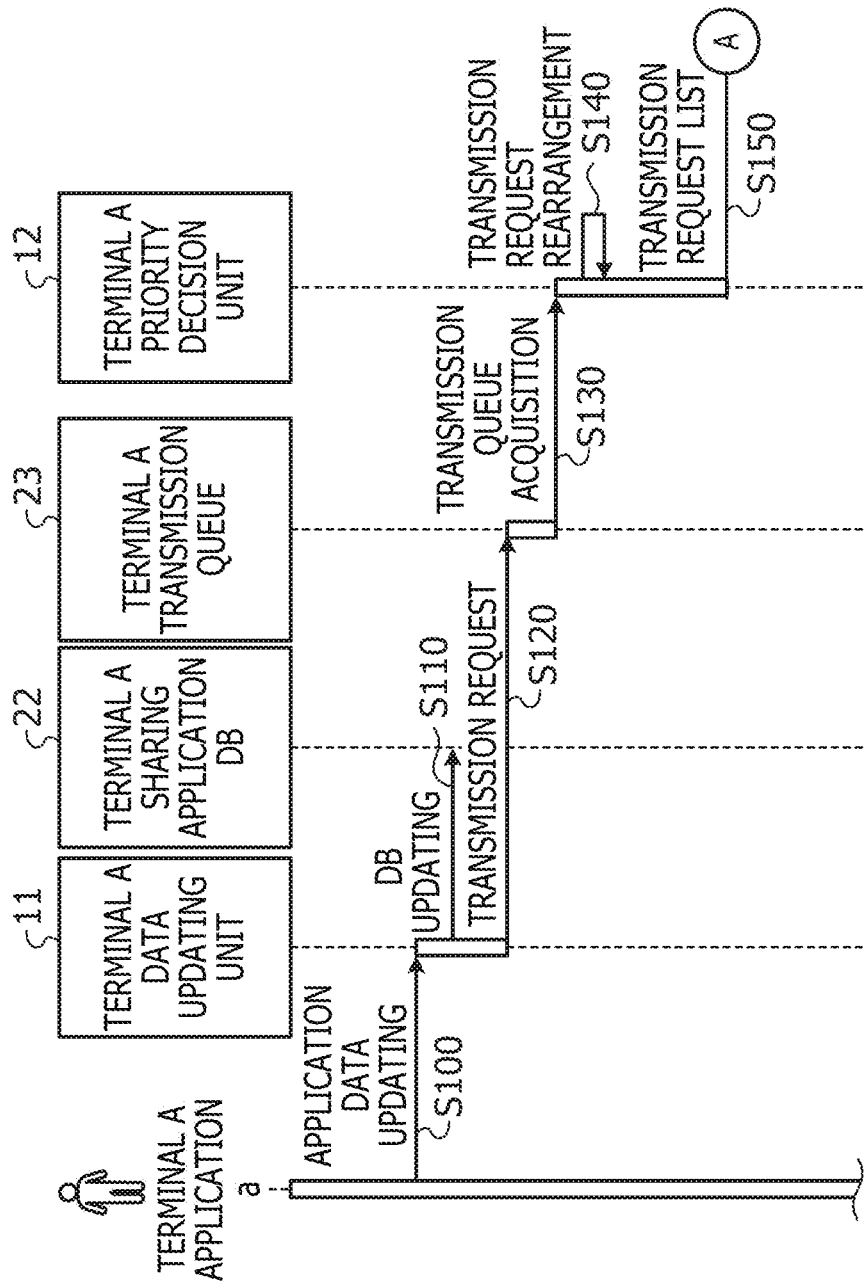

EFFECTIVE SYNCHRONOUS COMMUNICATION OF SCREEN INFORMATION SHARED AMONG INFORMATION PROCESSING APPARATUSES

CROSS-REFERENCE TO RELATED APPLICATION

This application is based upon and claims the benefit of priority of the prior Japanese Patent Application No. 2017-254759, filed on Dec. 28, 2017, the entire contents of which are incorporated herein by reference.

FIELD

The embodiment discussed herein relates to effective synchronous communication of screen information shared among information processing apparatuses.

BACKGROUND

In recent years, there is a user interface (UI) technology for digitalizing a space (for example, refer to Non-Patent Document 1). In such a space UI as just described, one window system is constructed using a wide space of a wall, a table or the like. Further, in such a space UI as described above, synchronous communication of screen information is performed between window systems by using a space such as the overall face of a wall or the like as a screen.

In the space UI in which the overall face of a wall or the like is used as a screen, it is possible to increase the number of windows to be displayed on the screen. The data amount required for communication with some other window system increases as the number of windows increases. However, there is a limit to the bandwidth available for communication. Therefore, if the individual window systems transmit and receive all data changed as a result of operation of a window, overflow occurs with the bandwidth, resulting in failure in appropriate data distribution. Therefore, appropriate suppression of transmission is demanded. As an example of suppression of transmission, the flow rate of data may be changed in response to the degree of congestion of the bandwidth in some cases.

However, if the flow rate of data is merely changed in response to the congestion degree of the bandwidth, the flow rate of all data to be changed varies, thereby influencing the user experience (UX). The UX here signifies experience the user gains through utilization of the service, and signifies, for example, comfort or the like in addition to ease of use to the user. For example, in a case where there are a window a that is not watched by the user and a window b that is watched by the user, if the bandwidth congests, suppression of transmission is performed for all windows and the flow rate of data decreases. As a result, there is the possibility that the window b watched by the user may not be displayed smoothly.

Therefore, suppression of transmission based on the experience of the user is demanded when communication congests.

For example, a technology is disclosed in which, to a computer on which data changed on its desktop is not in a visible state, changed data is not transferred, but transfer of data is triggered by transition of the computer to a state in which data is visible. It is disclosed that, according to the technology, in the case where change occurs with data of a specific shared application, pieces of data whose probability of co-occurrence in the data set exceeds a specific threshold value are transferred at the same time (for example, refer to Patent Document 1).

Meanwhile, according to another example, a technology is disclosed in which, in the case where one user and another user share a same content or relating contents, on a client terminal operated by the one user, information of the same or relating content is displayed preferentially to information of the other contents (for example, refer to Patent Documents 2 and 3).

As for the related art, the following documents have been disclosed.

PATENT DOCUMENTS

Patent Document 1: Japanese Laid-open Patent Publication No. 11-272591
Patent Document 2: International Publication Pamphlet No. WO 2012/056727
Patent Document 3: Japanese Laid-open Patent Publication No. 2007-58644

Non-Patent Document

Non-Patent Document 1: S. Izadi, et al. 2003. Dynamo: a public interactive surface supporting the cooperative sharing and exchange of media. In Proc. of UIST '03. ACM, 159-168

SUMMARY

According to an aspect of the embodiments, an apparatus shares a common displaying space with other apparatuses, and stores a priority with which data is to be transmitted, in association with an application which operates using each window displayed on the common displaying space. In response to updating of data by each application, the apparatus performs transmission and reception of updated data generated by the application. Upon reception of first updated data generated by a first application, the apparatus changes, based on proximity between a first window of the first application and a second window of a second application, a second priority that is stored in association with the second application. When second updated data is generated by the second application that operates using the second window displayed on the apparatus, the apparatus determines, based on the changed second priority, a turn in order of transmission of the second updated data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view depicting an example of a data structure of a window information table according to the working example;

FIG. 5 is a view depicting an example of a data structure of shared data according to the working example;

FIG. 6 is a view depicting an example of a data structure of application information according to the working example;

FIG. 7 is a view depicting an example of a data structure of a priority map according to the working example;

FIG. 8 is a view depicting an example of transmission request data according to the working example;

FIG. 9 is a view depicting an example of transmission/reception data according to the working example;

FIGS. 12A and 12B represent a view depicting an example of a sequence of a synchronous controlling process according to the working example;

DESCRIPTION OF EMBODIMENTS

The suppression of transmission in the space UI has a problem that it sometimes fails to improve the user operability. For example, in the case of a space UI in which a space of the overall face of a wall or the like is shared as a screen between apparatuses, if communication congests, the user operability may not be improved.

For example, in the technology in which data is transferred by taking transition of the computer into a state in which data is visible as a trigger, pieces of data co-occurring when the data is changed are transferred at the same time. However, in the case where data to be transferred when the computer is placed into a state in which data is visible is data within a window the user does not watch, since the user does not watch the window, the user operability is not improved.

Further, in the technology in which information of a same or relating content is displayed preferentially to information of the other contents, in the case where information of a relating content is data within a window the user does not watch, since the user does not watch the window, the user operability is not improved.

Further, there is a contrivance that determines the priority of processing based on an overlapping order of windows. As an example, drawing of a window displayed on the top of the overlap is prioritized. According to such a contrivance as just described, it is possible to preferentially transmit updated data of a window the user watches. However, since, in the space UI, the UI itself is large like the overall face of a wall, windows do not overlap with each other in many cases, and it is difficult to decide the window the user watches simply from the overlapping order of windows. Accordingly, in the case of the space UI, if communication congests, the user operability may not be improved.

It is preferable to improve, in the case of a space UI in which a space of the overall face of a wall or the like is shared as a screen between apparatus, the user operability even if communication congests.

In the following, a working example of an information processing apparatus, an information sharing system and a synchronous controlling method disclosed herein is described in detail with reference to the drawings. It is to be noted that the present disclosure is not limited by the working example.

Working Example

[Configuration of Information Sharing System According to Working Example]

Figure 1A:
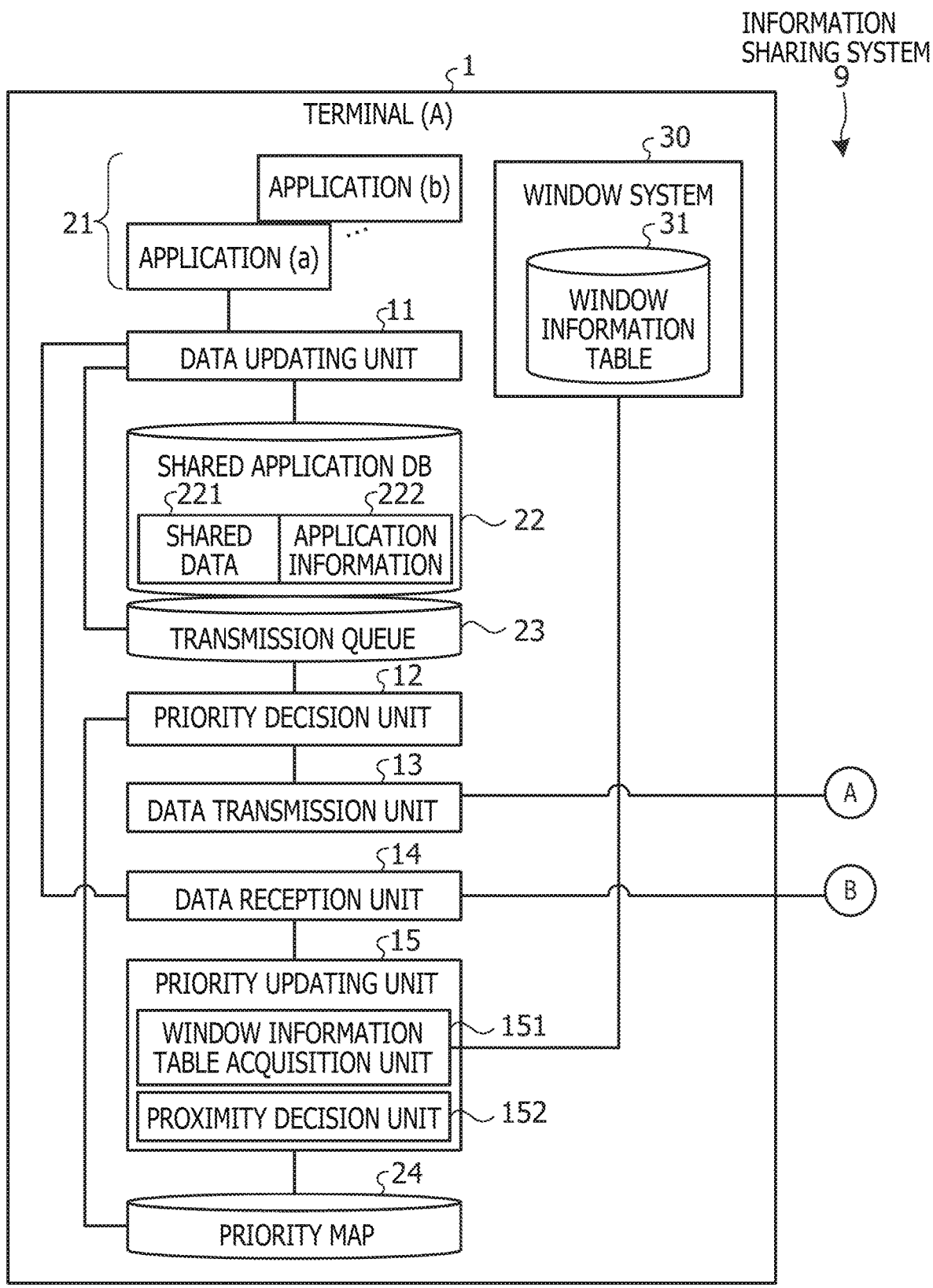
FIGS. 1A and 1B represent a functional block diagram depicting a configuration of an information sharing system according to a working example.
Figure 1B:
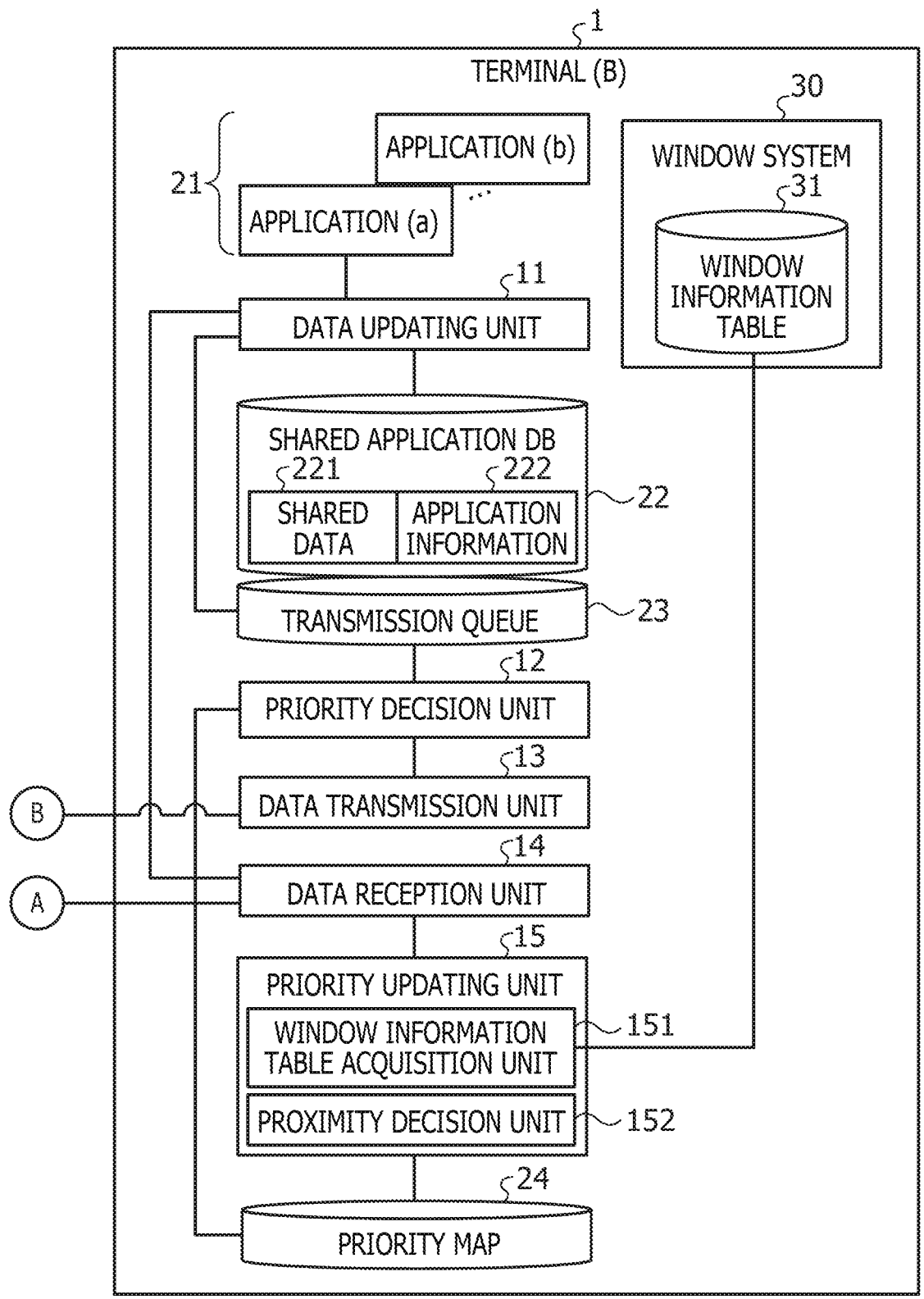

FIGS. 1A and 1B represent a functional block diagram depicting a configuration of an information sharing system according to a working example. As depicted in FIGS. 1A and 1B, the information sharing system 9 includes a plurality of terminals 1. In the UI technology that digitalizes a space, the plurality of terminals 1 share a common displaying space thereamong and perform synchronous control of updated data. Each terminal 1 changes the priority of, in addition to a window of data being operated by the user, a different window proximate to the window of the operated data so as to increase. The displaying space here signifies, for example, a screen image displayed on a wall, a table or the like. "Proximate" here signifies spatial, semantic, or temporal closeness. "Spatially proximate" signifies closeness between windows in terms of the distance. "Semantically proximate" signifies closeness in relevance between applications operating in windows. "Temporally proximate" signifies closeness in update time between data updated in individual windows. Consequently, the terminal 1 may preferentially distribute data of a window having a high degree of necessity to the user who operates the window. For example, the terminal 1 may control data of a window that is spatially, semantically, or temporally proximate to the window being operated by the user such that the data is distributed preferentially for synchronization.

Figure 2:
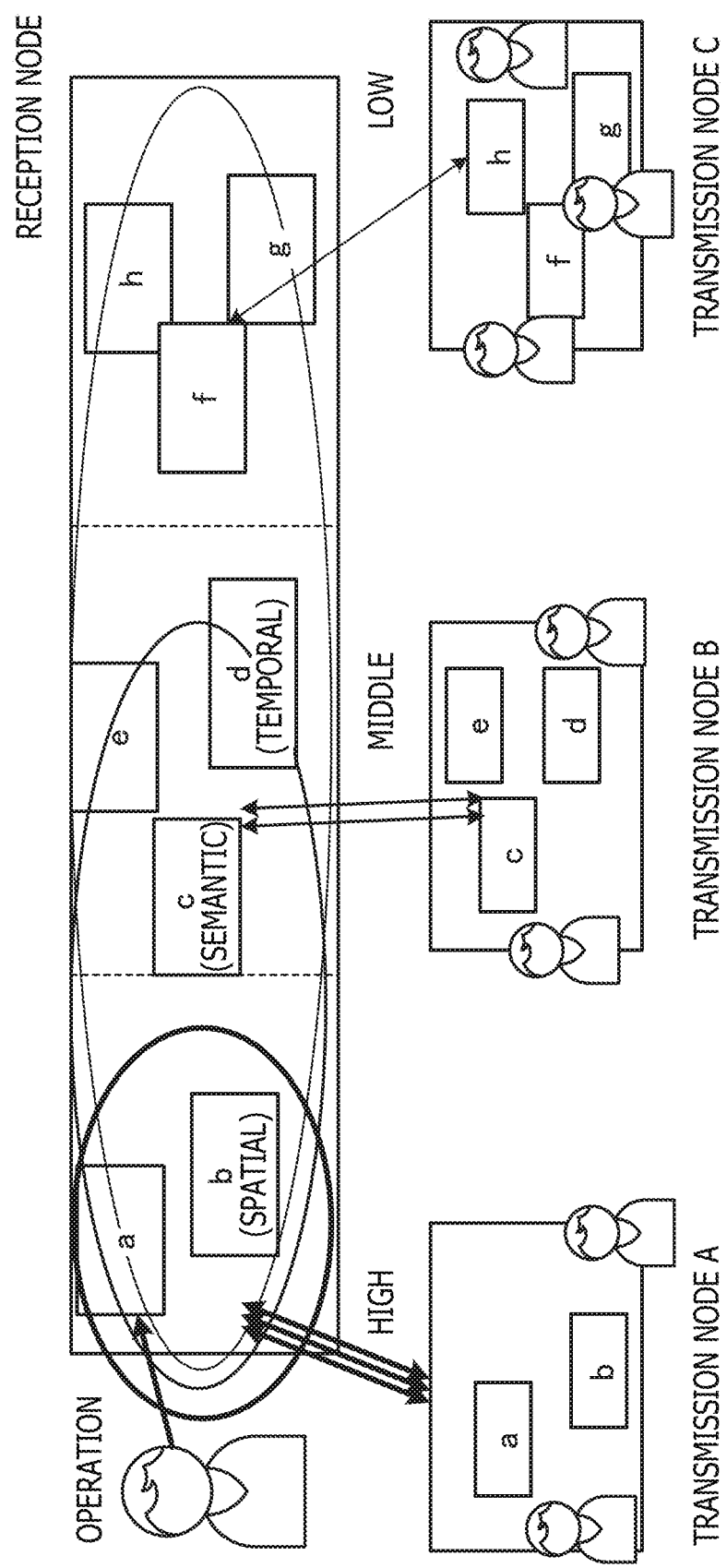
FIG. 2 is a view depicting a concept of synchronous control according to the working example.

Here, a concept of the synchronous control according to the working example is described with reference to FIG. 2. FIG. 2 is a view depicting a concept of the synchronous control according to the working example. It is to be noted that nodes depicted in FIG. 2 individually correspond to the terminals 1. Reference characters a to h depicted in FIG. 2 individually signify windows in which applications operate.

As depicted in FIG. 2, when the user operates a window of an application displayed on a reception node and data is synchronized from the application, a transmission node changes the priority of a different window proximate to the synchronized data (the window being operated by the reception node) such that the priority of the different window increases. Here, it is assumed that the user operates a window a of the application and data is updated from the application. Then, the transmission node changes the priority of a different window b spatially proximate to the window a being operated so as to increase. Further, the transmission node changes the priority of a different window c semantically proximate to the window a being operated so as to increase. Further, the transmission node changes the priority of a different window d temporally proximate to the window a being operated so as to increase.

Then, the transmission node determines a turn in transmission order of the updated data, based on the priorities of the individual windows, and performs distribution of the updated data in accordance with the turn in the determined order so as to synchronize data between the nodes. Here, it is assumed that the priorities of the windows of the applications are those of the window a, window b, window c, and window d in the descending order. Consequently, the transmission node A distributes data updated in, in addition to the window a, the window b as high-priority data. For example, the transmission node A distributes data to be updated in the window a and the window b to a reception node that displays the window a and the window b. Then, the transmission node B distributes data to be updated in the window c and the window d as intermediate-priority data. For example, the transmission node B distributes the data to be updated in the window c and the window d to a reception node that displays the window c and the window d. Thereafter, the transmission node C distributes data to be updated in the window f, window g, and window h as low-priority data. For example, the transmission node C distributes data to be updated in the window f, window g, and window h to a reception node that displays the window f, window g, and window h.

Consequently, a reception node may increase the priority of, in addition to a window of data being operated by the user, windows proximate to the data being operated. As a result, the reception node may preferentially receive data having a high degree of necessity to the user (data the user watches). For example, the reception node may enhance the user operability even if communication congests.

Figure 3:
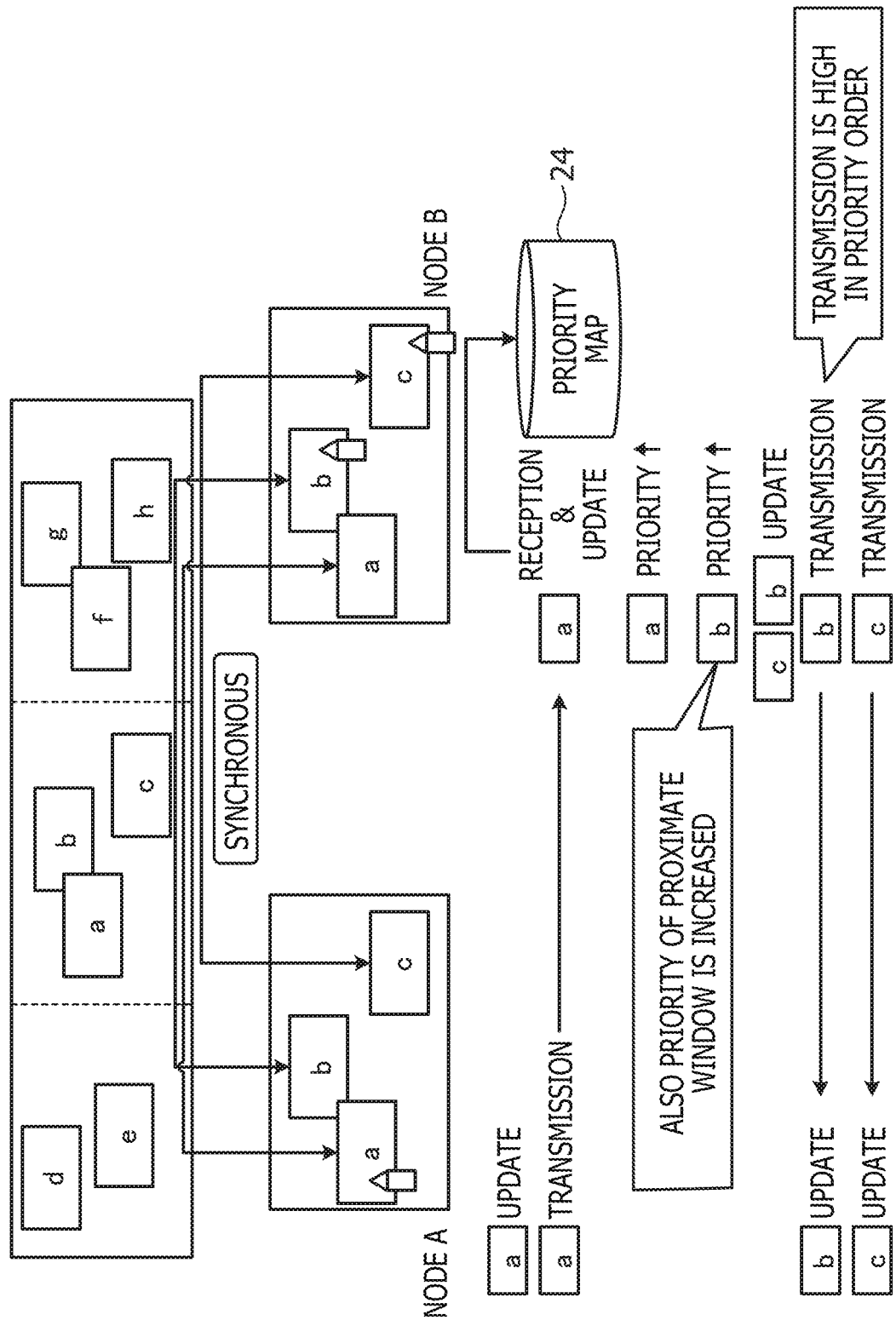
FIG. 3 is a view depicting an example of a synchronous controlling process according to the working example.

Further, an example of the synchronous controlling process according to the working example is described with reference to FIG. 3. FIG. 3 is a view depicting an example of the synchronous controlling process according to the working example. It is to be noted that nodes depicted in FIG. 3 individually correspond to the terminals 1. Reference characters a to h indicated in FIG. 3 denote windows in each of which an application operates. In a common displaying space (screen), the windows a to h of the applications are displayed. On the nodes A and B, the windows a to c, from among the plurality of windows a to h displayed in the common displaying space (screen), are displayed.

In the node A, data is updated from the application that operates in the window a and the updated data is transmitted to the node B for synchronization of the data in response to the updating of the data.

In the node B, when the updated data is received, the updated data of the application that operates in the window a is updated. In addition, in the node B, the priorities associated with the windows b and c of a different application are changed in a priority map 24 hereinafter described, based on the proximity between the window a of the application by which the updated data is updated and the windows b and c of the different applications. For example, the node B changes the priority of the window b proximate to the window a so as to increase. Here, since the window b is near in distance to the window a, the priority of the window b is increased.

In the node B, data is updated from the application that operates in the window c. Thereafter, in the node B, data is updated from the application that operates in the window b.

Consequently, the node B determines a turn in order of transmission of the updated data, based on the information stored in the priority map 24. Here, in the priority map 24, the priority of the window b is higher than that of the window c. Therefore, the node B determines an order of transmission such that, from between the updated data, the data updated from the application that operates in the window b precedes to the data updated from the application that operates in the window c.

Then, the node B transmits the data updated from the application that operates in the window b to the node A in accordance with the determined order of transmission. Consequently, the node A receives the updated data and updates the updated data of the application that operates in the window b.

Thereafter, the node B transmits the data updated from the application that operates in the window c, based on the determined order of transmission to the node A. Consequently, the node A receives the updated data and updates the updated data of the application that operates in the window c. Consequently, in the node A in which the window a is operated by the user, a piece of data updated in a window proximate to the window a, from among pieces of data updated within the node B, is synchronized preferentially. As a result, in the node A, even if communication congests, data having a high degree of necessity to the user may be synchronized more preferentially, and the user operability may be improved.

Referring back to FIGS. 1A and 1B, the terminal 1 includes a data updating unit 11, a priority decision unit 12, a data transmission unit 13, a data reception unit 14, and a priority updating unit 15. The terminal 1 includes an application 21, a shared application database (DB) 22, a transmission queue 23, and a priority map 24. The terminal 1 further includes a window system 30 that includes a window information table 31. It is to be noted that the terminal 1 is an example of an information processing apparatus.

The window system 30 is a system for displaying windows. It is to be noted that the windows are each a window in which an application 21 operates, and correspond, in a one-to-one relationship, to the applications 21. The window information table 31 indicates a table of window information for the individual windows displayed on the terminal 1.

Here, an example of a data structure of the window information table 31 is described with reference to FIG. 4. FIG. 4 is a view depicting an example of a data structure of the window information table according to the working example. As depicted in FIG. 4, the window information table 31 is information that associates an application identifier, display information, and last update time with a window identifier. The window identifier is an identifier allocated uniquely to each window. The application identifier is an identifier allocated uniquely to each application and an identifier of the application 21 operating in the window. The display information is information including coordinates, height, and width at and with which a window is displayed. The last update time is an update time at which the last operation was performed by the user. As an example, in the case where the window identifier is "W001," "A001" is stored as the application identifier, and "{x:0,y:0,width: 200,height:300}" is stored as the display information. In addition, "2017-11-28T00:11:22:000" is stored as the last update time.

Referring back to FIGS. 1A and 1B, the shared application DB 22 manages information of the application 21 and information of data that are shared with the different terminal 1. The shared application DB 22 includes shared data 221 and application information 222. The shared data 221 is information of updated data shared with the different terminal 1. The application information 222 is information of the application 21 shared with the terminal 1.

Here, an example of a data structure of the shared data 221 is described with reference to FIG. 5. FIG. 5 is a view depicting an example of a data structure of shared data according to the working example. As depicted in FIG. 5, the shared data 221 indicates information that associates data, an updater, and an update time with a data identifier. The data identifier indicates an identifier for uniquely identifying the updated data. The data indicates the substance of the updated data. The updater indicates a node of the user for which the updated data has been updated. The update time indicates an update time of the updated data.

As an example, in the case where the data identifier is "D0001," "{abc:def}" is stored as the data; "Kani" is stored as the updater; and "2017-11-28T00:11:22:000" is stored as the update time.

Here, an example of a data structure of the application information 222 is described with reference to FIG. 6. FIG. 6 is a view depicting an example of a data structure of application information according to the working example. As depicted in FIG. 6, the application information 222 is information that associates a content, an origin, and a category with an application identifier. The application identifier is an identifier allocated uniquely to each application 21. The application identifier corresponds to the application identifier of the window information table 31. The content indicates the substance itself of the application 21 displayed. The origin indicates information for identifying a creator or a manager of the application 21. The category indicates a type of the application 21. As the category, for example, a text editor (Text-editor) for editing a text, an image editor for editing an image and so forth are available. It is to be noted that, as the application 21 whose category is the text editor, for example, Word, Excel, PowerPoint and so forth are available.

As an example, in the case where the application identifier is "A001," "ghi:jkl, ... " is stored as the content; "Example.com" is stored as the origin; and "Text-editor" is stored as the category.

Referring back to FIGS. 1A and 1B, the transmission queue 23 manages transmission request data in accordance with the first-in first-out (FIFO) method. It is to be noted that an example of a data structure of transmission request data is hereinafter described.

Referring back to FIGS. 1A and 1B, the priority map 24 is information in which a priority when updated data is transmitted from the application 21 to a different terminal 1 is mapped in association with the application 21. The priority is used, for example, when an order of transmission is to be determined. It is to be noted that, although it is described that the priority map 24 is information in which a priority is mapped in association with the application 21, the priority map 24 is not limited to this. For example, the priority map 24 may be information in which priorities are mapped in association with windows. Alternatively, the priority map 24 may be information not of the table type but of a tree structure. The priority map 24 is updated by a priority updating unit 15 hereinafter described.

Here, an example of a data structure of the priority map 24 is described with reference to FIG. 7. FIG. 7 is a view depicting an example of a data structure of the priority map according to the working example. As depicted in FIG. 7, the priority map 24 is information that associates priority map identifiers and priorities with each other. The priority map identifier is an identifier for identifying a target to which a priority is to be mapped. In the working example, the priority map identifier signifies an application identifier allocated uniquely to each application 21. The priority map identifier corresponds to the application identifier of the application information 222. The priority signifies a priority in accordance with which the updated data is to be transmitted to the application 21 of a different terminal 1. It is to be noted that the priority may be a turn in order of transmission.

As an example, in the case where the priority map identifier is "A001," "500" is stored as the priority. In the case where the priority map identifier is "A003," "8075" is stored as the priority.

Referring back to FIGS. 1A and 1B, the data updating unit 11 updates information of the data (synonymous with application data) updated from the application 21 into the shared application DB 22. For example, in the case where the data (application data) updated from the application 21 is data updated in the own terminal 1, the data updating unit 11 stores transmission request data for the updated data into the transmission queue 23. Then, the data updating unit 11 updates the information of the updated data into the shared data 221 of the shared application DB 22. On the other hand, in the case where the data (application data) updated from the application 21 is application data updated by the different terminal 1, the data updating unit 11 updates the information of the updated data into the shared data 221 of the shared application DB 22.

Here, an example of the transmission request data is described with reference to FIG. 8. FIG. 8 is a view depicting an example of the transmission request data according to the working example. As depicted in FIG. 8, the transmission request data is data that associates a data identifier, an application identifier, and transmission request time with each other. The data identifier is an identifier for uniquely identifying the updated data. The data identifier corresponds to the data identifier of shared data. The application identifier is an identifier allocated uniquely to each application 21. The application identifier corresponds to the application identifier of the window information table 31. The transmission request time is time at which the transmission request is issued.

As an example, in the case where the data identifier is "D0001," "A001" is stored as the application identifier, and "2017-11-28T00:11:22:000" is stored as the transmission request time.

Referring back to FIGS. 1A and 1B, the priority decision unit 12 decides the priority of the transmission request data, based on the priority map 24. The priority decision unit 12 determines an order of transmission and a data amount of transmission in response to the priority. For example, in the case where transmission request data exist in the transmission queue 23, the priority decision unit 12 compares the application identifiers of all transmission request data with the priority map identifiers of the priority map 24, and acquires the priority corresponding to coincident priority map identifiers. The priority decision unit 12 stores all transmission request data in the descending order of the priority into a transmission list. Then, the priority decision unit 12 outputs the transmission list to the data transmission unit 13. It is to be noted that, although the priority decision unit 12 stores transmission request data in the descending order of the priority into a transmission list to create the transmission list, the creation of the transmission list is not limited to this. The priority decision unit 12 may also create a transmission list using the priorities and the differences between the transmission request time and the transmission processing time. For example, the priority decision unit 12 adds, for all transmission request data included in the transmission queue 23, the value of the difference of the transmission request time from the transmission processing time and the priority corresponding to the application identifier to calculate the sum value. Then, the priority decision unit 12 may store all transmission request data in the descending order of the sum value into a transmission list to create the transmission list. Further, the priority decision unit 12 may store part of the transmission request data in the descending order of priority into the transmission list in response to the load to the bandwidth. Further, in the case where the load to the bandwidth is higher than a given value, the priority decision unit 12 may cancel the transmission process and clear the transmission list and then return the transmission request data included in the transmission list back into the transmission queue 23.

The data transmission unit 13 transmits the transmission data (transmission/reception data) including application data to the transmission request data, in the order of storage into the transmission list, to the terminal 1 in the information sharing system 9. Information of the terminal 1 in the information sharing system 9 may be stored, for example, in terminal information (not depicted) in which the destinations of all terminals 1 are stored.

The data reception unit 14 receives transmission/reception data including application data transmitted from the different terminal 1. Then, the data reception unit 14 outputs the transmission/reception data including the application data to the data updating unit 11 in order to update the application data into the shared data 221. In addition, the data reception unit 14 outputs the transmission/reception data including the application data to the priority updating unit 15 hereinafter described.

Here, an example of the transmission/reception data is described with reference to FIG. 9. FIG. 9 is a view depicting an example of transmission/reception data according to the working example. The transmission/reception data is data that associates a data identifier, a destination, an application identifier, data, and transmission time with each other. The data identifier is an identifier for uniquely identifying the updated data. The data identifier corresponds to the data identifier of shared data. The destination is information of a destination to which the updated data is to be transmitted. The application identifier is an identifier allocates uniquely to each application 21. The application identifier corresponds to the application identifier of the window information table 31. The data is the substance itself of the updated data. The transmission time is time at which the data is transmitted.

As an example, in the case where the data identifier is "D0001," "Tanaka" is stored as the destination; "A001" is stored as the application identifier; "{abc:def}" is stored as the data, and "2017-11-28T00:11:22:500" is stored as the transmission time.

Referring back to FIGS. 1A and 1B, the priority updating unit 15 updates the priority associated with a different application, based on the proximity between the window of the application 21 whose application data is updated and a window of the different application. It is to be noted that the priority updating unit 15 includes a window information table acquisition unit 151 and a proximity decision unit 152.

The window information table acquisition unit 151 acquires all window information from the window information table 31.

The proximity decision unit 152 acquires transmission/reception data and acquires an application identifier of the acquired transmission/reception data. The proximity decision unit 152 acquires window information corresponding to the acquired application identifier from all window information. The acquired window information is information of windows in which the application 21 whose updated data (application data) is updated operates.

Then, the proximity decision unit 152 decides a window spatially proximate to the window in which the updated data is operated, and updates the priority of the spatially proximate window to a higher level. Such spatial proximity is based on a prediction that, for example, a window whose coordinates are proximate to those of the window in which the updated data is operated and which has a great display region is a window watched by the user.

Then, the proximity decision unit 152 decides a window temporally proximate to the window in which the updated data is operated, and updates the priority of the temporally proximate window to a higher level. Such temporal proximity is based on a prediction that, for example, a window updated at time proximate to that of the window in which the updated data is operated is high in use value to the user.

The proximity decision unit 152 decides a window semantically proximate to the window in which the updated data is operated, and updates the priority of the different window that is semantically proximate, to a higher level. Such semantic proximity is based on a prediction that, for example, if applications 21, which are same in origin or category, operate in a window in which the updated data is operated and a different window, the two windows have a relevance.

Then, the proximity decision unit 152 updates the priority map 24, based on the priorities of the individual windows.

Example of Priority Updating

Figure 10:
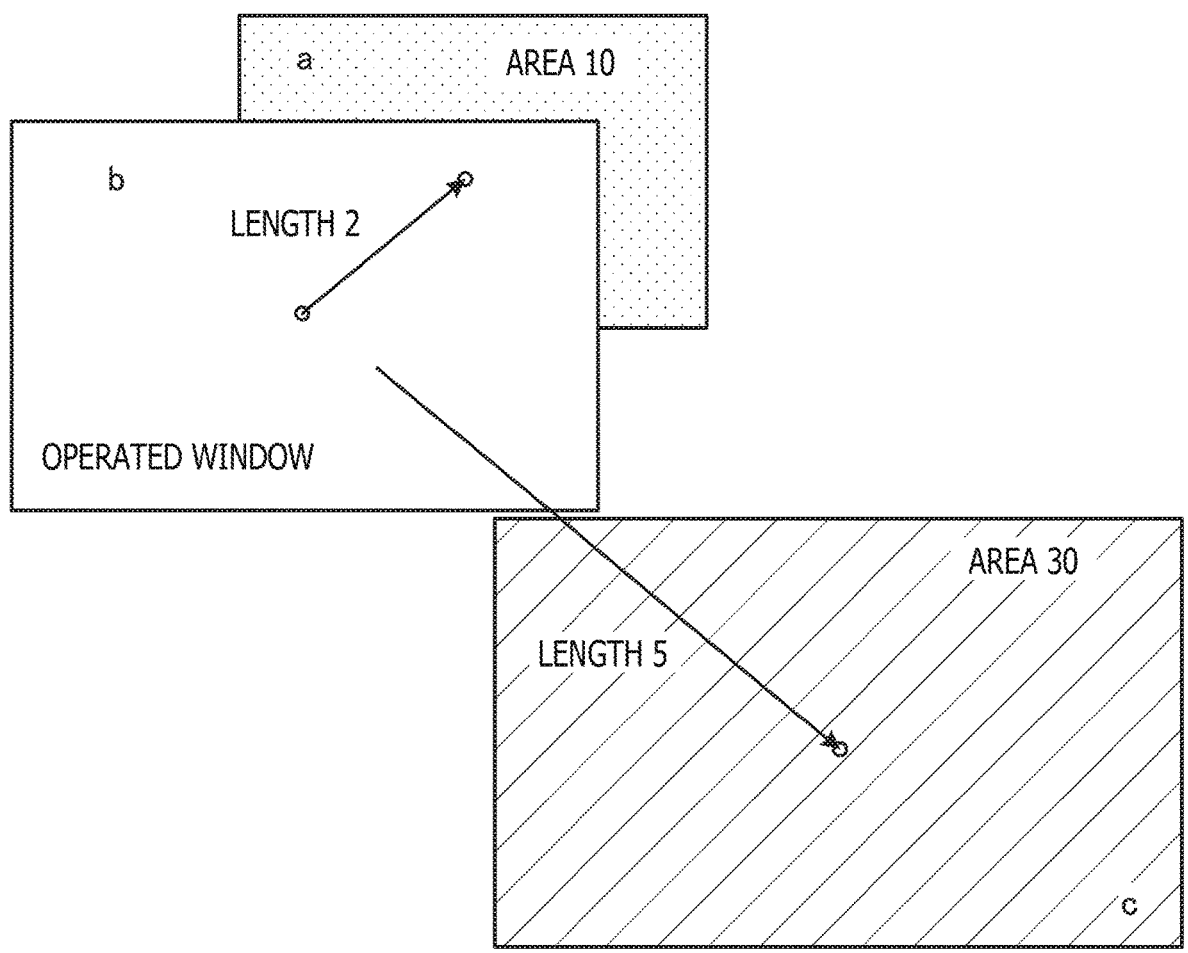
FIG. 10 is a view depicting an example of priority updating according to the working example.

Here, an example of priority updating executed by the priority updating unit 15 is described with reference to FIG. 10. FIG. 10 is a view depicting an example of priority updating according to the working example. It is to be noted that the priority updating based on spatial proximity is described with reference to FIG. 10. It is assumed that, as depicted in FIG. 10, a window in which update data is operated is a window denoted by reference character b. The proximity decision unit 152 calculates the distance between the window b in which the updated data is operated and other windows a and c from window information acquired by the window information table acquisition unit 151. Here, the distance between the center coordinates of the operated window b and the center coordinates of the window a is length 2. Meanwhile, the distance between the center coordinates of the operated window b and the center coordinates of the window c is length 5.

Further, the proximity decision unit 152 calculates the display area of the other windows. Here, the display area of the window a is 10. The display area of the window c is 30.

Further, the proximity decision unit 152 updates, for each different window, a value obtained by dividing the display area by the distance as a priority. Here, for the window a, the value 5 obtained by dividing the display area 10 by the distance 2 is updated as the priority. For the window c, the value 6 obtained by dividing the display area 30 by the distance 5 is updated as the priority. Consequently, the proximity decision unit 152 prioritizes the window c that is spatially proximate to the operated window b and has a great display region.

Example of Utilization of Priority

Figure 11:
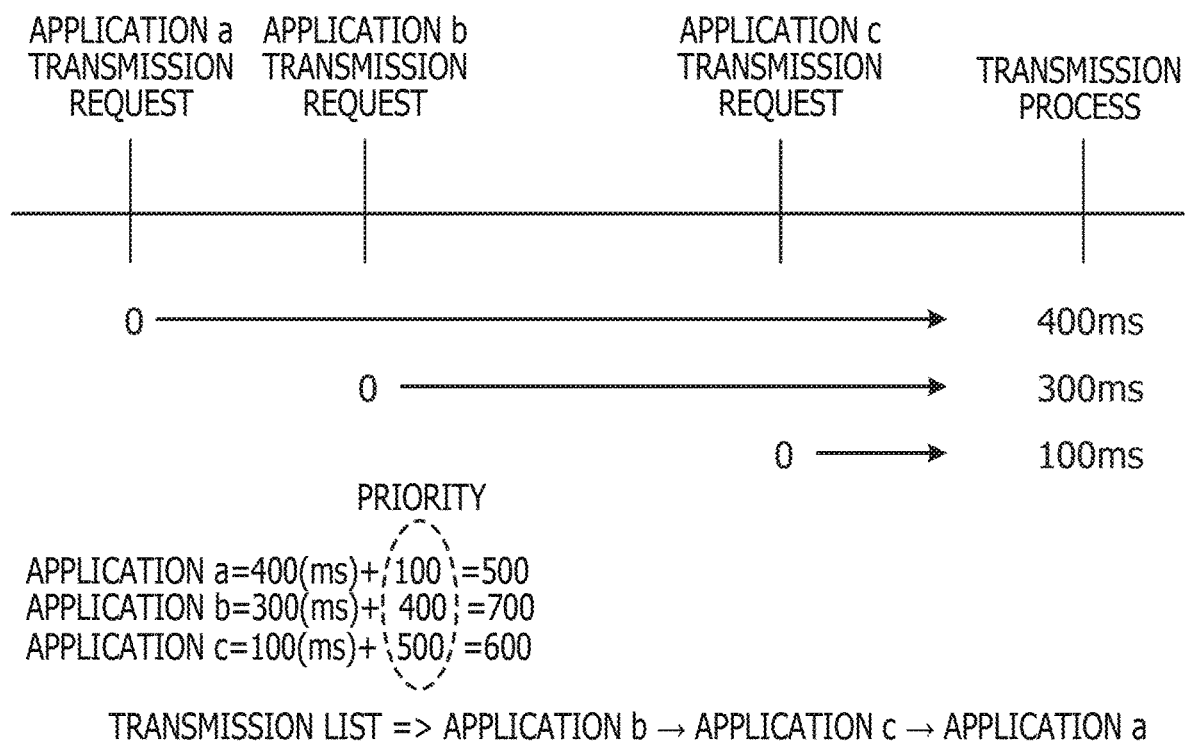
FIG. 11 is a view depicting an example of utilization of priority according to the working example.

Here, an example of utilization of priority is described with reference to FIG. 11. FIG. 11 is a view depicting an example of utilization of priority according to the working example. It is to be noted that a case is described in which the priority decision unit 12 that utilizes the priority creates a transmission list by using the priority and the difference between transmission request time and transmission processing time.

The priority decision unit 12 checks the transmission queue 23 after every fixed period of time and performs a priority decision process in the case where the transmission queue 23 includes transmission request data. In the priority decision process, a value is calculated for all transmission request data existing in the transmission queue 23, by adding a value obtained by subtracting the transmission request time from the transmission processing time and the priority corresponding to the application identifier of the transmission request data.

Here, it is assumed that, in the transmission queue 23, transmission request data from the application a, transmission request data from the application b, and transmission request data from the application c exist.

Consequently, the priority decision process calculates a value by subtracting the time of the transmission request set to the transmission request data from the application a, from the time of the transmission process. It is assumed that the calculated value is 400 milliseconds (ms). The priority decision process compares the application identifier of the transmission request data from the application a, with the priority map identifiers of the priority map 24, to acquire the priority corresponding to the coincident priority map identifier. It is assumed that the acquired priority is 100. Accordingly, the value obtained by adding the value obtained by subtraction of the pertaining time and the priority corresponding to the application a is 500.

Further, the priority decision process calculates a value by subtracting the time of transmission request set to the transmission request data from the application b, from the time of the transmission process. It is assumed that the calculated value is 300 milliseconds (ms). The priority decision process compares the application identifier of the transmission request data from the application b, with the priority map identifiers of the priority map 24, to acquire the priority corresponding to the coincident priority map identifier. It is assumed that the acquired priority is 400. Accordingly, the value obtained by adding the value obtained by subtraction of the pertaining time and the priority corresponding to the application b is 700.

Further, the priority decision process calculates a value by subtracting the time of transmission request set to the transmission request data from the application c from the time of the transmission process. It is assumed that the calculated value is 100 milliseconds (ms). The priority decision process compares the application identifier of the transmission request data from the application b, with the priority map identifiers of the priority map 24, to acquire the priority corresponding to the coincident priority map identifier. It is assumed that the acquired priority is 500. Accordingly, the value obtained by adding the value obtained by subtraction of the pertaining time and the priority corresponding to the application b is 600.

Then, the priority decision process stores all transmission request data in the descending order of the value into a transmission list to create the transmission list. Here, the priority decision process creates a transmission list in which the transmission request data from the application b, transmission request data from the application c, and transmission request data from the application a are stored in this order. Consequently, the priority decision unit 12 may prioritize, by determining the transmission order from the priority and the transmission request time, the turn in transmission of the transmission request data whose transmission request was received earlier, and may prioritize the turn in transmission of transmission request data having a high priority.

[Sequence of Synchronous Controlling Process]

Figure 12B:
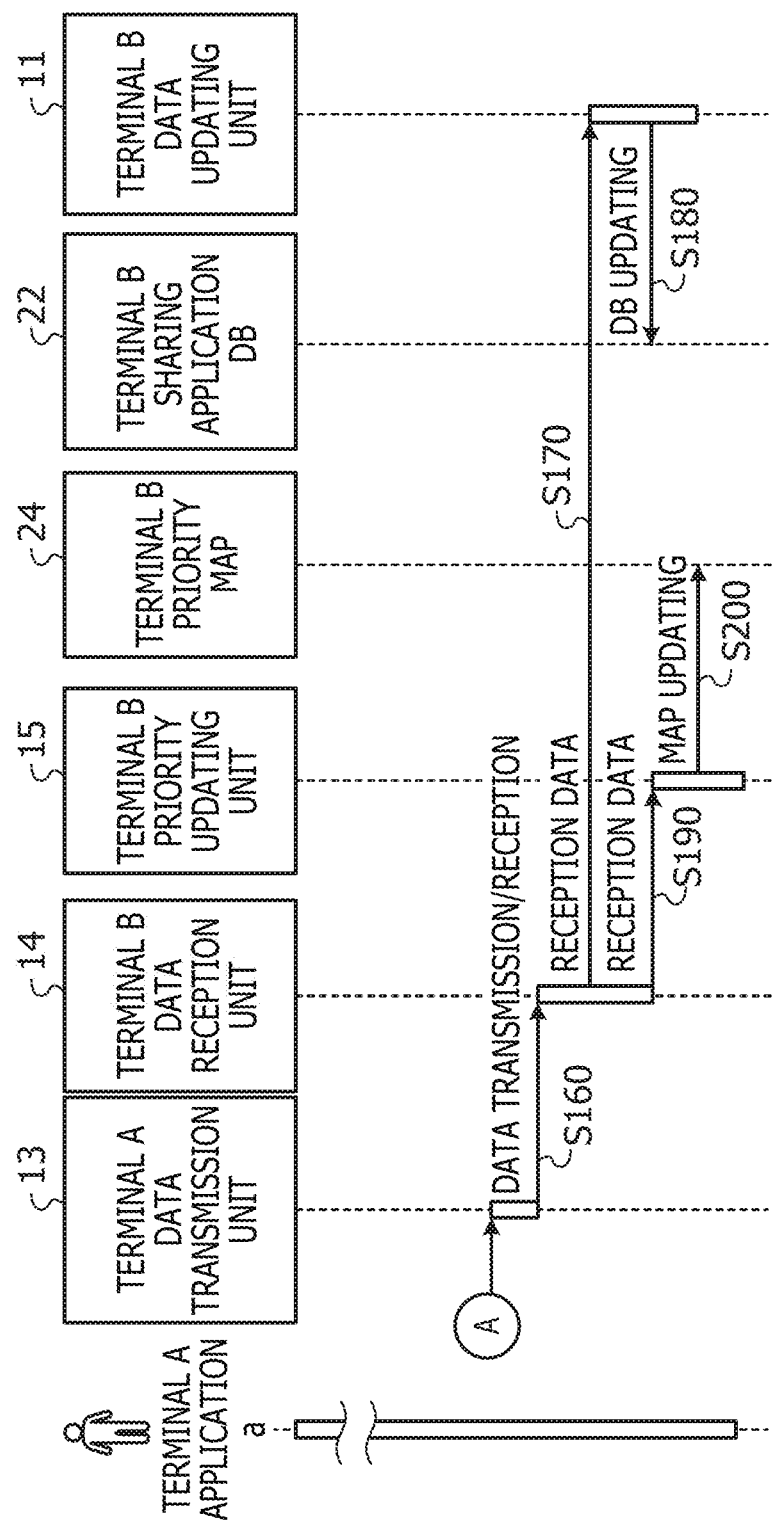

Here, an example of a sequence of the synchronous controlling process is described with reference to FIGS. 12A and 12B. FIGS. 12A and 12B represent a view depicting an example of a sequence of the synchronous controlling process according to the working example. It is to be noted that a case is described with reference to FIGS. 12A and 12B in which the terminals 1 include a terminal A and another terminal B.

As depicted in FIGS. 12A and 12B, in the terminal A, application data from the application a is updated (S100). Consequently, the data updating unit 11 updates information of the updated application data into the shared data 221 of the shared application DB 22 (S110). The data updating unit 11 stores transmission request data for the updated application data into the transmission queue 23 (S120).

Then, in the terminal A, the priority decision unit 12 acquires the transmission request data from the transmission queue 23 (S130). The priority decision unit 12 refers to the priority map 24 to rearrange the transmission order of transmission request data (S140) and creates a transmission request table (transmission list). As an example, the priority decision unit 12 refers to the priority map 24 to rearrange the transmission order of the transmission request data into the descending order of the priority. As another example, the priority decision unit 12 rearranges the transmission order of the transmission request data into the descending order of the value obtained by addition of the difference between the transmission request time and the transmission processing time of the transmission request data and the priority of the priority map 24. Then, the priority decision unit 12 outputs the created transmission request table to the data transmission unit 13 (S150).

Then, in the terminal A, the data transmission unit 13 transmits, to the terminal B, transmission data (transmission/reception data) including application data to the transmission request data, in the order in which the transmission request data have been stored into the transmission request table (S160).

Then, in the terminal B, the data reception unit 14 receives the transmission data from the terminal A and outputs the received reception data to the data updating unit 11 and the priority updating unit 15 (S170 and S190). The data updating unit 11 updates the information of the application data included in the reception data to the shared data 221 of the shared application DB 22 (S180).

In the terminal B, the priority updating unit 15 updates the priority map 24, based on the proximity between a window in which the application corresponding to the application identifier included in the reception data operates and a window in which a different application operates (S200). For example, the priority updating unit 15 acquires all window information from the window information table 31 of the window system 30. Then, the priority updating unit 15 refers to the window information, by using the window identifier of the window in which the application corresponding to the application identifier included in the reception data operates as a key, to update the priority of a window, which is spatially proximate to the window, to a higher level. In addition, for example, the priority updating unit 15 refers to the last update time of the window information to update the priority of a window, which is updated at time proximate to that of the window in which the application data included in the reception data is operated, to a higher level. Furthermore, for example, the priority updating unit 15 refers to the application information 222 and the window information, to update the priority of a window in which an application 21 that is semantically proximate to the application 21 in which the application data included in the reception data is updated, to a higher level. Then, the priority updating unit 15 updates the priority map 24 by using such update information.

Thereafter, in the terminal B, when the application data is updated by the application 21, the data updating unit 11 stores the transmission request data for the updated application data into the transmission queue 23. Then, the priority decision unit 12 refers to the priority map 24 to rearrange the transmission order of the transmission request data stored in the transmission queue 23. Then, the data transmission unit 13 transmits the transmission request data in the rearranged order.

Now, an example of a flowchart of the synchronous controlling process according to the working example is described with reference to FIGS. 13 to 19. It is to be noted that, in the description given with reference to FIGS. 13 to 19, data updated from an application 21 is called application data.

[Flowchart of Data Updating Process]

Figure 13:
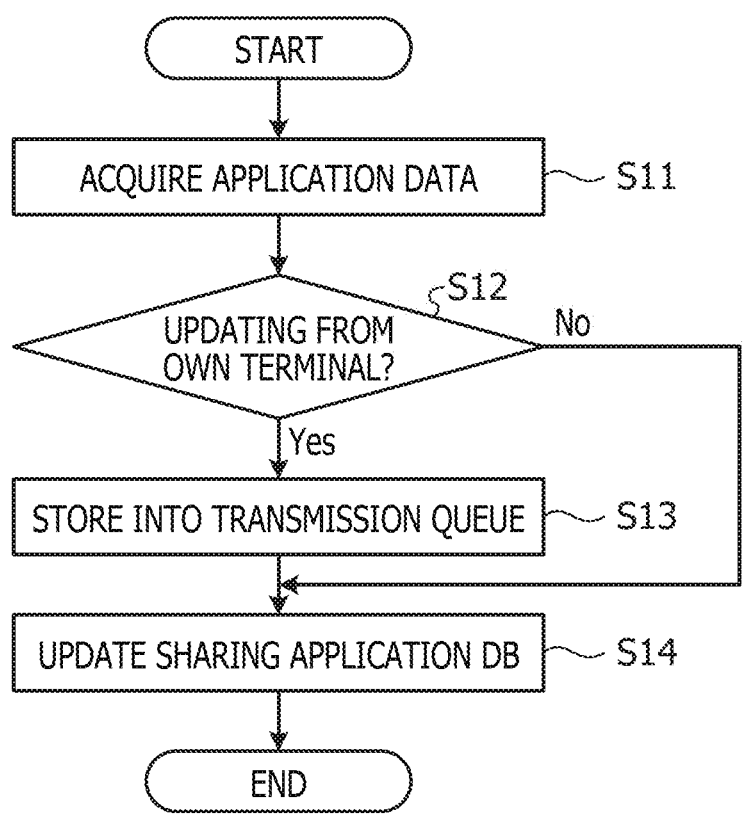
FIG. 13 is a view depicting an example of a flow chart of a data updating process according to the working example.

FIG. 13 is a view depicting an example of a flowchart of a data updating process according to the working example. As depicted in FIG. 13, the data updating unit 11 acquires application data (step S11) and decides whether or not updating originates from the own terminal 1 (step S12). In the case where the data updating unit 11 decides that updating does not originate from the own terminal 1 (step S12: No), the data updating unit 11 advances its processing to step S14.

On the other hand, in the case where the data updating unit 11 decides that updating originates from the own terminal 1 (step S12: Yes), the data updating unit 11 stores transmission request data for the application data into the transmission queue 23 (step S13). Then, the data updating unit 11 advances the processing to step S14.

At step S14, the data updating unit 11 updates the information of the application data into the shared data 221 of the shared application DB 22 (step S14). Then, the data updating unit 11 ends the data updating process.

[Flowchart of Priority Decision Process]

Figure 14:
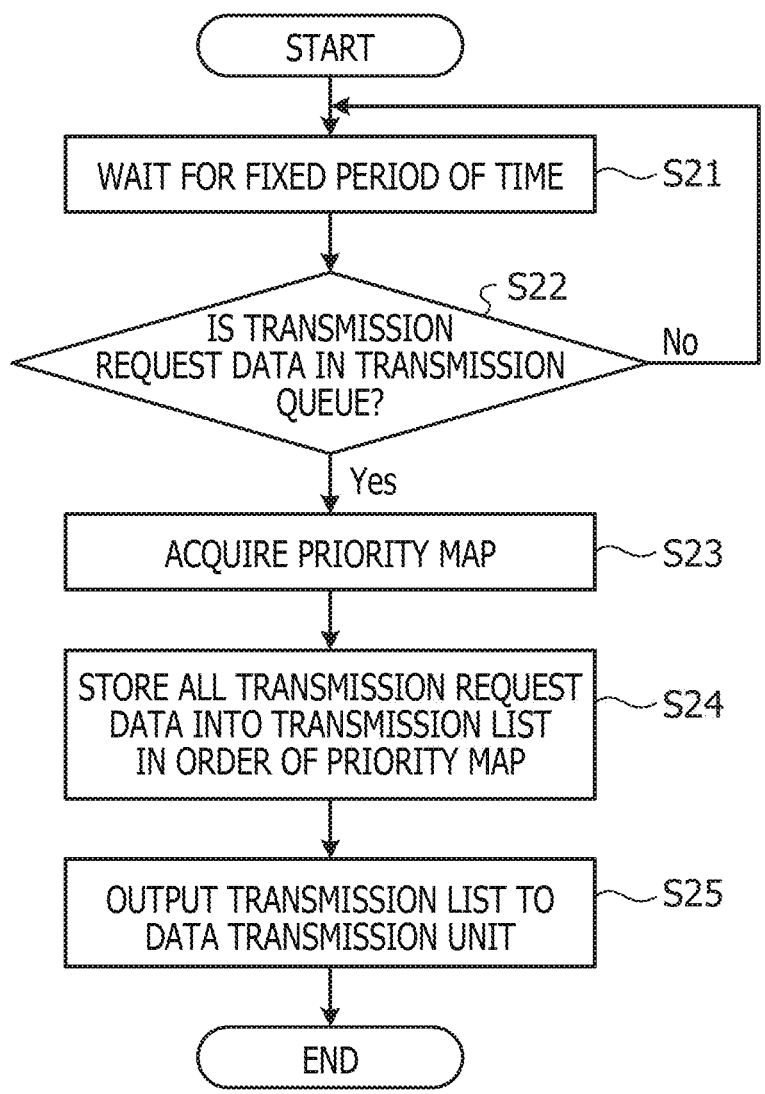
FIG. 14 is a view depicting an example of a flow chart of a priority decision process according to the working example.

FIG. 14 is a view depicting an example of a flowchart of a priority decision process according to the working example. As depicted in FIG. 14, the priority decision unit 12 waits for a fixed period of time (step S21) and decides whether or not t transmission request data exists in the transmission queue 23 (step S22). In the case where it is decided that transmission request data does not exist in the transmission queue 23 (step S22: No), the priority decision unit 12 returns to step S21 to wait for the fixed period of time.

On the other hand, in the case where it is decided that transmission request data exists in the transmission queue 23 (step S22: Yes), the priority decision unit 12 acquires the priority map 24 from the storage unit (not depicted) (step S23). Then, the priority decision unit 12 stores all transmission request data in the order of the priority map 24 into a transmission list (step S24). As an example, the priority decision unit 12 refers to the priority map 24 to rearrange the transmission order of all transmission request data into the descending order of the priority and store the transmission request data into the transmission list. As another example, the priority decision unit 12 rearranges the transmission order of all transmission request data in the descending order of the value obtained by the addition of the difference between the transmission request time and the transmission processing time of the transmission request data and the priority of the priority map 24, and stores the transmission request data into the transmission list.

Then, the priority decision unit 12 outputs the transmission list to the data transmission unit 13 (step S25). Then, the priority decision unit 12 ends the priority decision process.

[Flowchart of Data Transmission Process]

Figure 15:
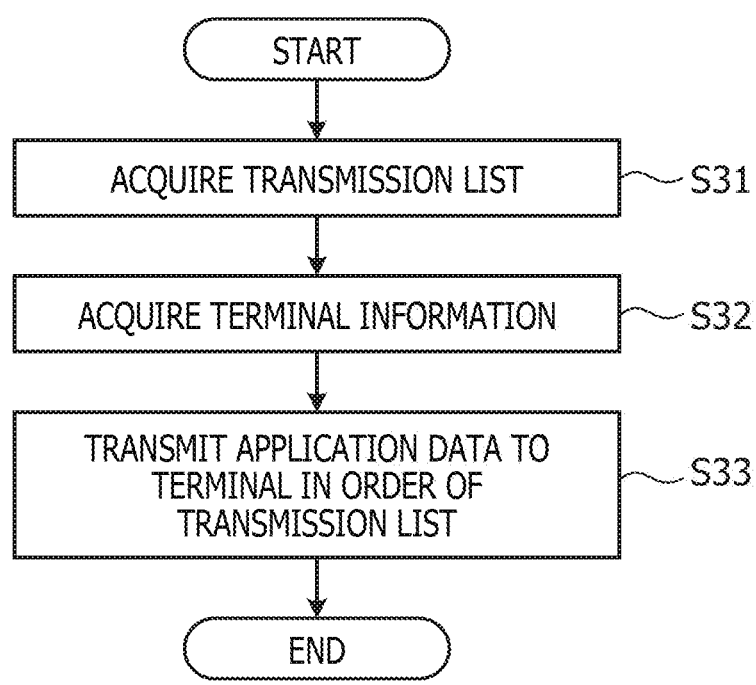
FIG. 15 is a view depicting an example of a flow chart of a data transmission process according to the working example.

FIG. 15 is a view depicting an example of a flowchart of a data transmission process according to the working example. As depicted in FIG. 15, the data transmission unit 13 acquires a transmission list from the priority decision unit 12 (step S31). The data transmission unit 13 acquires terminal information from a storage unit (not depicted) (step S32). In the terminal information, for example, destinations of all terminals 1 in the information sharing system are stored.

Then, the data transmission unit 13 transmits the updated application data in the order of the transmission list to the terminal 1 of the acquired terminal information (step S33). Then, the data transmission unit 13 ends the data transmission process.

[Flowchart of Data Reception Process]

Figure 16:
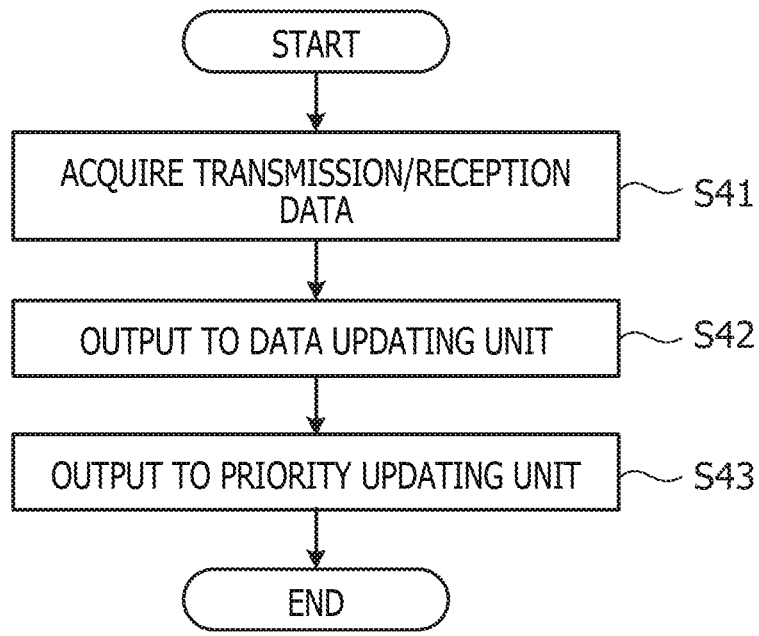
FIG. 16 is a view depicting an example of a flow chart of a data reception process according to the working example.

FIG. 16 is a view depicting an example of a flowchart of a data reception process according to the working example. As depicted in FIG. 16, the data reception unit 14 acquires transmission/reception data from one of the terminals 1 in the information sharing system 9 (step S41). The data reception unit 14 outputs the acquired transmission/reception data to the data updating unit 11 (step S42). This is performed in order to update information of application data included in the transmission/reception data into the shared application DB 22.

Then, the data reception unit 14 outputs the acquired transmission/reception data to the priority updating unit 15 (step S43). This is intended to update the priority of an application 21 related to the application 21 that has updated application data included in the acquired transmission/reception data, to a higher level. Then, the data reception unit 14 ends the data reception process.

[Flowchart of Priority Updating Process]

Figure 17:
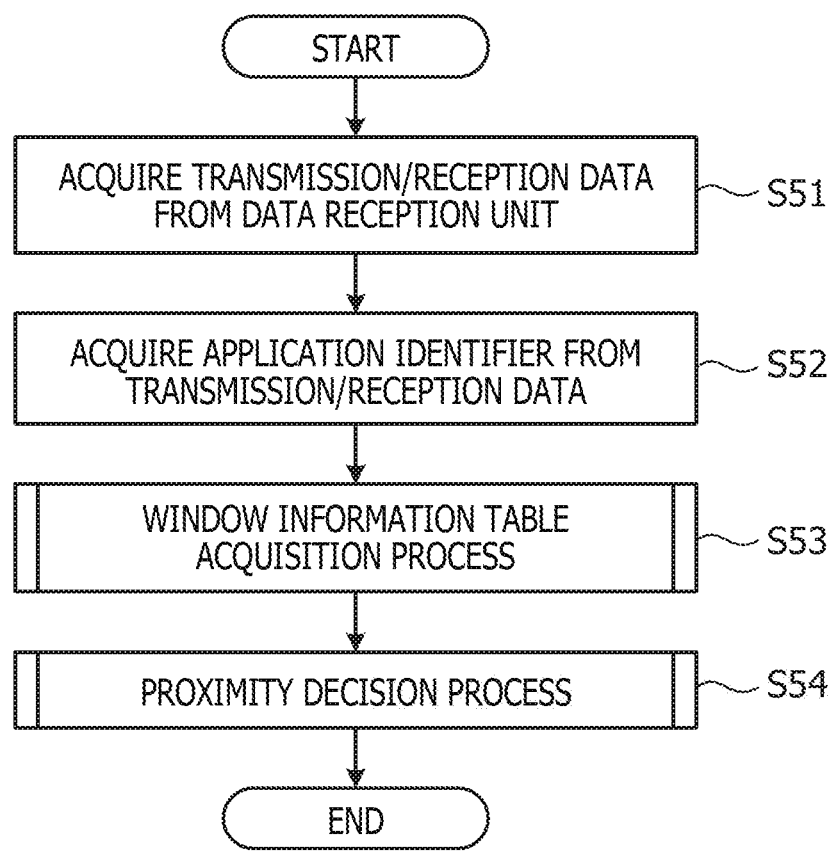
FIG. 17 is a view depicting an example of a flow chart of a priority updating process according to the working example.

FIG. 17 is a view depicting an example of a flowchart of a priority updating process according to the working example. As depicted in FIG. 17, the priority updating unit 15 acquires transmission/reception data from the data reception unit 14 (step S51). The priority updating unit 15 acquires an application identifier from the acquired transmission/reception data (step S52).

The priority updating unit 15 executes a process for acquiring the window information table 31 (step S53). It is to be noted that a flowchart of the window information table acquisition process is hereinafter described.

The priority updating unit 15 executes a proximity decision process using the window information table 31 to update the priority map 24 (step S54). It is to be noted that a flowchart of the proximity decision process is hereinafter described. Then, the priority updating unit 15 ends the priority updating process.

[Flowchart of Window Information Table Acquisition Process]

Figure 18:
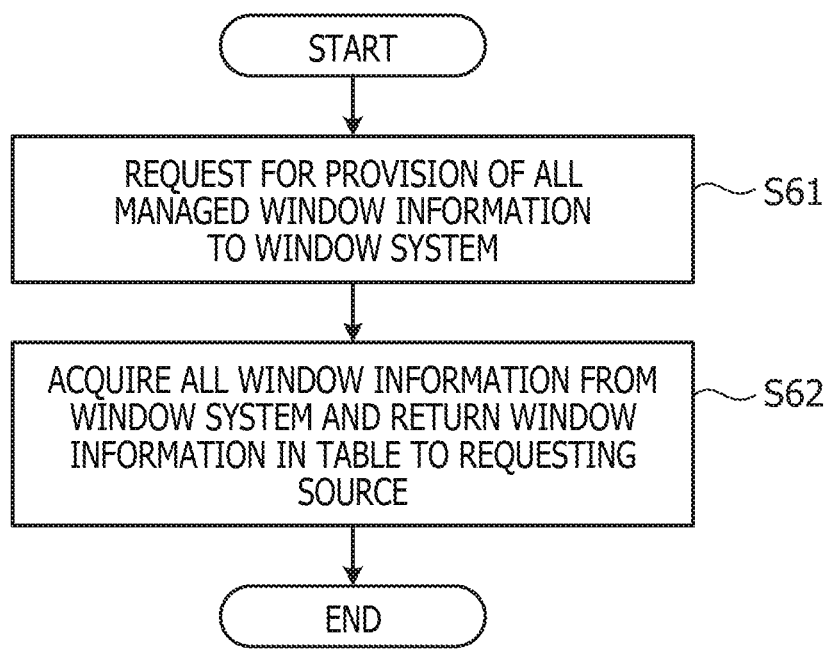
FIG. 18 is a view depicting an example of a flow chart of a window information table acquisition process according to the working example.

FIG. 18 is a view depicting an example of a flowchart of a window information table acquisition process according to the working example. As depicted in FIG. 18, the window information table acquisition unit 151 requests the window system 30 for provision of all window information managed thereby (step S61).

Then, the window information table acquisition unit 151 acquires all window information from the window system 30, creates a table of the window information, and returns the table to the requesting source (step S62). Then, the window information table acquisition unit 151 ends the window information table acquisition process.

[Flowchart of Proximity Decision Process]

Figure 19:
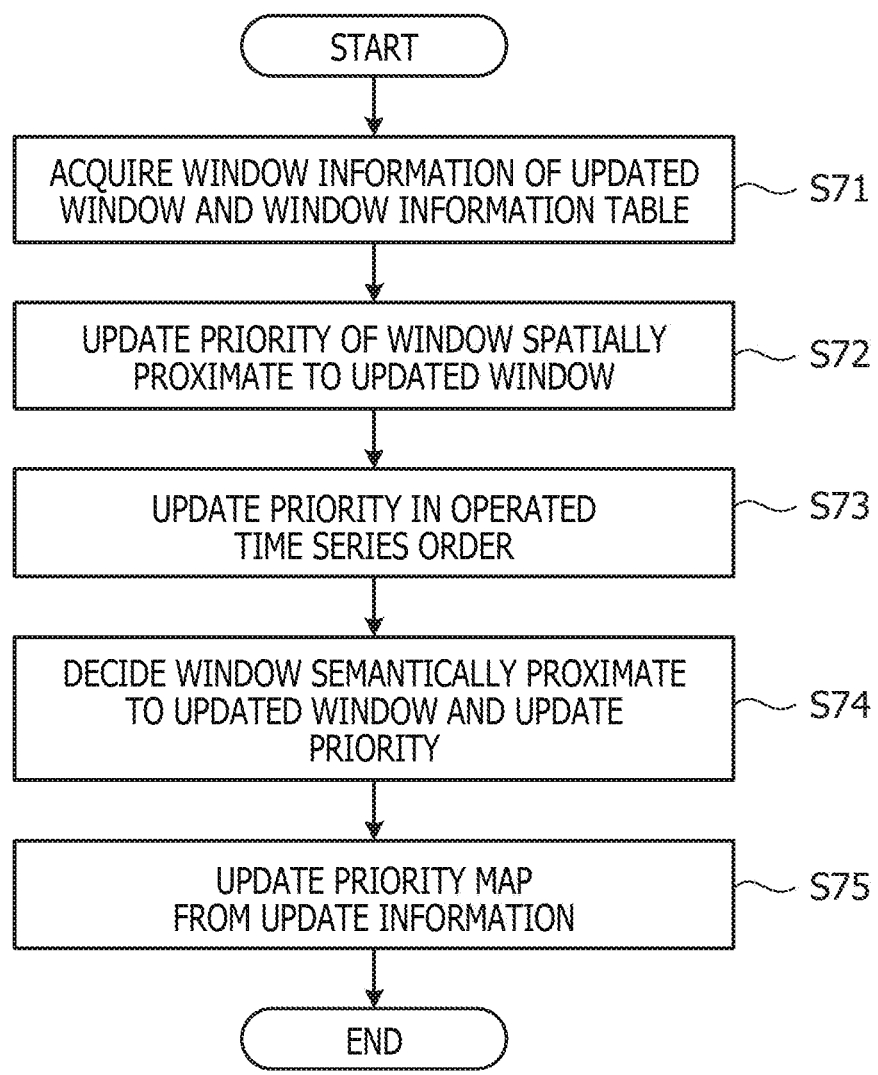
FIG. 19 is a view depicting an example of a flow chart of a proximity decision process according to the working example.

FIG. 19 is a view depicting an example of a flowchart of a proximity decision process according to the working example. As depicted in FIG. 19, the proximity decision unit 152 acquires window information of an updated window and the window information table 31 (step S71). For example, the proximity decision unit 152 acquires the window information table 31 from the priority updating unit 15. In addition, the proximity decision unit 152 acquires window information of a window corresponding to the application identifier acquired from the transmission/reception data from the window information table 31. The acquired window information is window information of the updated window.

Then, the proximity decision unit 152 updates the priority of a window spatially proximate to the updated window to a higher level (step S72). For example, the proximity decision unit 152 acquires display information from the window information of the updated window. Then, the proximity decision unit 152 calculates, using the display information acquired from the window information of the updated window and display information of window information of a different window in the window information table 31, the distance between the center coordinates of the different window and the center coordinates of the updated window. Then, the proximity decision unit 152 calculates, for each different window, the display area by using the display information included in the window information of the different windows. Then, the proximity decision unit 152 updates, for each different window, based on the distance to the updated window and the display area, the priority of the different window spatially proximate to the updated window to a higher level. For example, the spatial proximity is based on the prediction that a window whose coordinates are proximate to those of the window in which the updated data is operated and which has a great display area is a window watched by the user.

Then, the proximity decision unit 152 updates the priorities in the operated time series order (step S73). For example, the proximity decision unit 152 refers to the last update time included in the window information of the different windows to update the priority in a time series order from the last update time of the updated window. For example, the temporal proximity is based on the prediction that a window updated at time proximate to that of the window in which the updated data is operated is high in use value to the user.

Then, the proximity decision unit 152 decides a window semantically proximate to the updated window to update the priority of the window to a higher level (step S74). For example, the proximity decision unit 152 acquires the application information 222 corresponding to the application 21 that operates in the updated window. The proximity decision unit 152 acquires the application information 222 corresponding to the application identifier in the window information of the different windows. Then, the proximity decision unit 152 refers to the application information 222 of the updated window and the application information 222 of the different windows to determine a different window that is semantically proximate to the application 21 that operates in the updated window. As an example, the proximity decision unit 152 determines a semantically proximate different window from the origin or the category included in the application information 222. For example, the semantic proximity is based on the prediction that, if applications 21 that are same in origin or category operate in a window in which the updated data is operated and a different window, the two windows have a relevance. Then, the proximity decision unit 152 sets the priority of the different window semantically proximate to the updated window to a higher level.

Then, the proximity decision unit 152 updates the priority map 24 from the update information at steps S72 to S74 (step S75). Then, the proximity decision unit 152 ends the proximity decision process.

[Advantageous Effect of Working Example]

In this manner, in the working example described above, the terminal 1 stores, into the priority map 24, priorities when data is transmitted in association with the applications 21 that individually operate in a plurality of windows displayed on a common displaying space. The terminal 1 performs, in response to updating of data from any of the plurality of applications 21, transmission/reception of the updated data. In the case where updated data is received, the terminal 1 changes the priority associated with a different application 21 in the priority map 24, based on proximities between the window of the application 21 by which the updated data is updated and windows of the different applications 21. Then, in the case where data is to be updated from an application 21 that operates in a window displayed on the own terminal, the terminal 1 determines a turn in order of transmission of data of updated data, based on the priority information of the priority map 24. With such a configuration as described above, in the case of a space UI in which a displaying space such as the overall face of a wall or the like is shared as a screen between the terminals 1, even if the communication congests, the user operability is improved by the terminals 1 determining an order of transmission of updated data using the proximity between windows in which the applications 21 operate. For example, even if the communication congests, the comfort of the user may be improved.

Further, the terminal 1 changes, based on the distances and the display areas of the window of the application 21 by which the updated data is updated and the windows of the different applications 21, the priorities associated with the different applications 21. The terminal 1 changes the priorities associated with the different applications 21, based on the difference between the update time of the updated data and the update time of data updated from the windows of the different applications 21. Further, the terminal 1 changes the priorities associated with the different applications, based on the relevance between the windows of the application 21 by which the updated data is updated and the windows of the different applications 21. Then, the terminal 1 changes the priorities associated with the applications 21, based on part or the entirety of the changing process of the priorities. With such a configuration as just described, the terminal 1 may increase the priority of an application 21 that operates in a different window proximate to the window of the application 21 by which the updated data is updated, and may set the priority of the application 21 operating in a window that is watched by the user to a higher level.

Further, the terminal 1 rearranges the turn in order of transmission of updated data, based on the priority information stored in the priority map 24 and the difference between the transmission processing time and the time at which the transmission request is received. With such a configuration as just described, the terminal 1 may prioritize the turn in transmission order of transmission request data in regard to which the transmission request is received early, while prioritizing the turn in transmission order of the transmission request data of a high priority, by determining the order of transmission from the priority and the time at which the transmission request is received.

The terminal 1 further determines the transmission flow rate of updated data, based on the priority information stored in the priority map 24. With such a configuration as just described, in the case where the communication congests, the terminal 1 may change the transmission flow rate of the updated data and may reduce the network load.

[Others]

It is to be noted that it is described in the description of the working example that the proximity decision unit 152 updates the priority of a window that is spatially, temporally or semantically proximate to a window in which update data is updated to a higher level. However, the updating of a priority is not limited to this, and the proximity decision unit 152 may update, by grasping the presence itself of the user by utilizing a proximity sensor or the like, the priority of data with which a window displayed at a physically short distance from the user is operated to a higher level. Since this makes it possible for the proximity decision unit 152 to grasp the position of the user, data estimated to have a high value to the user may be grasped, and the grasped data may be shared with certainty and preferentially. Consequently, the user operability may be improved.

Further, the proximity decision unit 152 may update the priority of data by an operation determined in advance of the user. For example, the proximity decision unit 152 may change the priority in response to an operation of the user such as to operate a window so as to come nearer or to overlap a window and then remove the window. For example, the proximity decision unit 152 may increase or decrease the priority in response to an operation of the user determined in advance. Since this makes it possible for the proximity decision unit 152 to grasp an operation of the user, data estimated to have a high value to the user may be grasped and the grasped data may be shared with certainty and preferentially. Consequently, the user operability may be improved.

Further, the terminal 1 may be implemented by incorporating the data updating unit 11, priority decision unit 12, data transmission unit 13, data reception unit 14, priority updating unit 15 and so forth described hereinabove into a known information processing apparatus such as a personal computer or a work station.

Further, the components of the apparatus depicted in the drawings may not necessarily be configured physically in such a manner as depicted in the drawings. For example, a particular mode of disintegration or integration of the components of the apparatus is not limited to that depicted in the drawings, and the components may be functionally or physically disintegrated or integrated in an arbitrary unit in response to various loads, use situations or the like. For example, the data transmission unit 13 and the data reception unit 14 may be integrated into a single functional unit. Further, the proximity decision unit 152 may be disintegrated into a first decision unit that decides spatial proximity, a second decision unit that decides temporal proximity, and a third decision unit that decides semantic proximity. Further, the window system 30 may be coupled as an external apparatus of the terminal 1 via a network. Furthermore, a storage unit not depicted, such as the shared application DB 22, may be coupled as an external apparatus of the terminal 1 via a network.

Figure 20:
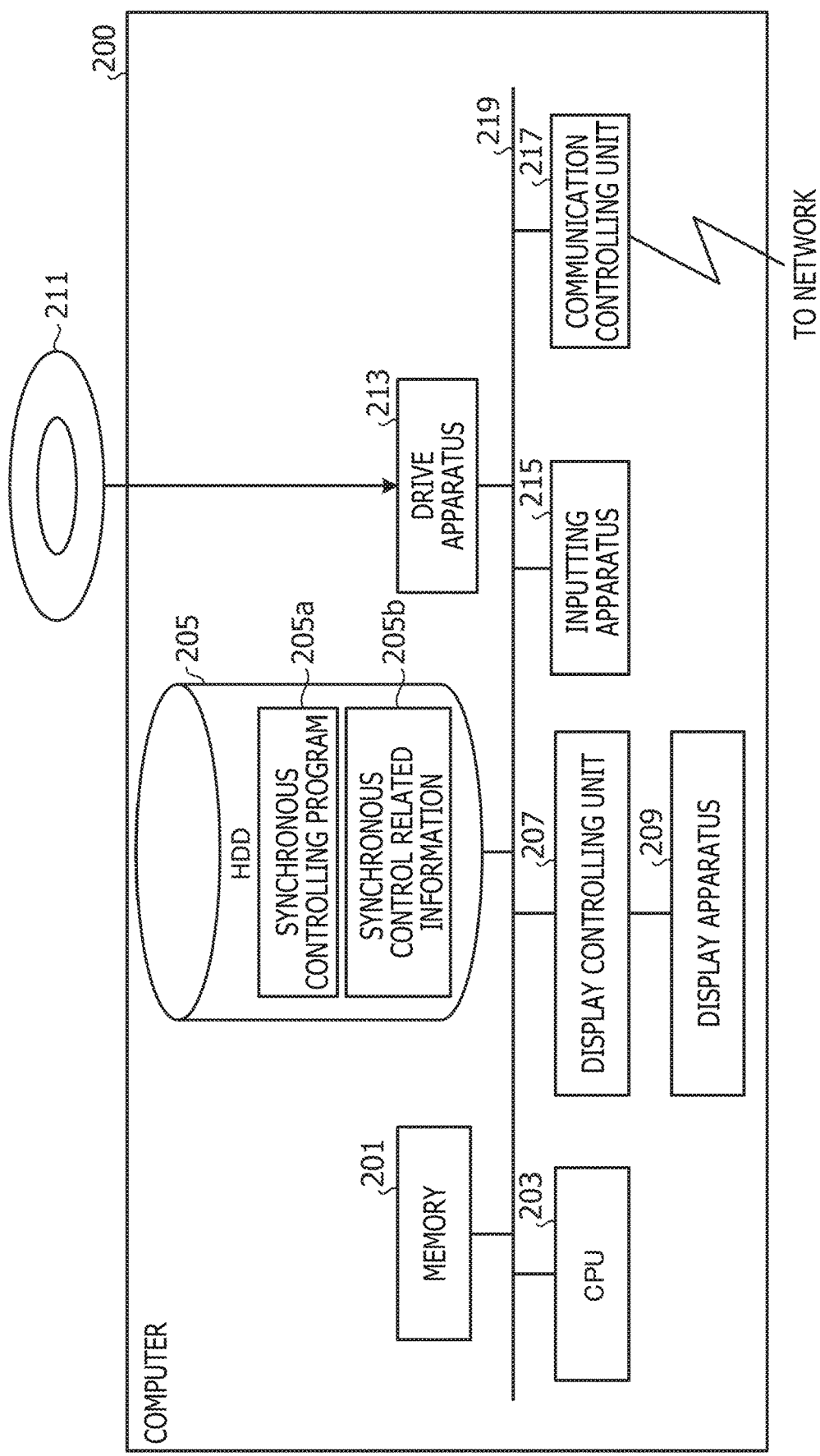
FIG. 20 is a view depicting an example of a computer that executes a synchronous controlling program.

Further, the various processes described hereinabove in connection with the working example may be implemented by execution of a program prepared in advance on a computer such as a personal computer or a work station. Thus, in the following, an example of a computer that executes a synchronous controlling program that implements functions similar those of the terminal 1 depicted in FIGS. 1A and 1B is described. FIG. 20 is a view depicting an example of a computer that executes the synchronous controlling program.

As depicted in FIG. 20, the computer 200 includes a central processing unit (CPU) 203 that executes various arithmetic processes, an inputting apparatus 215 that accepts an input of data from the user, and a display controlling unit 207 that controls a display apparatus 209. The computer 200 further includes a drive apparatus 213 that reads the program and so forth from a storage medium, and a communication controlling unit 217 that performs transfer of data to and from a different computer through a network. The computer 200 further includes a memory 201 that temporarily stores various kinds of information, and a hard disk drive (HDD) 205. The memory 201, CPU 203, HDD 205, display controlling unit 207, drive apparatus 213, inputting apparatus 215, and communication controlling unit 217 are coupled to each other via a bus 219.

The drive apparatus 213 is an apparatus, for example, for a removable disk 211. The HDD 205 stores a synchronous controlling program 205a and synchronous control related information 205b.

The CPU 203 reads out and deploys the synchronous controlling program 205a in the memory 201 and executes the synchronous controlling program 205a as a process. Such a process as just described corresponds to various functions of the terminal 1. The synchronous control related information 205b corresponds to information of the shared application DB 22, transmission queue 23, priority map 24 and so forth stored in a storage unit not depicted of the terminal 1. For example, the removable disk 211 stores various information of the HDD 205 and so forth.

It is to be noted that the synchronous controlling program 205a may not necessarily be stored in the HDD 205 from the beginning. For example, the program is stored in advance into a "portable physical medium," which is inserted, for example, into the computer 200, such as a flexible disk (FD), a compact disk read only memory (CD-ROM), a digital versatile disk (DVD), a magneto-optical disk, or an integrated circuit (IC) card. Then, the computer 200 may read out the synchronous controlling program 205a from the portable physical medium and execute the synchronous controlling program 205a. All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus that shares a common displaying space with a different information processing apparatus, the information processing apparatus comprising:
   a memory configured to store a priority with which data is to be transmitted, in association with an application that operates using each of a plurality of windows displayed on the common displaying space; and
   a processor coupled to the memory and configured to:
      in response to updating of data executed by each of a plurality of applications, perform transmission and reception of the updated data of the application,
      upon reception of first updated data generated by a first application, change, based on proximity between a first window of the first application and a second window of a second application, a second priority that is stored in association with the second application in the memory, and
      when second updated data is generated by the second application that operates using the second window displayed on the information processing apparatus, determine, based on the changed second priority that is stored in the memory in association with the second application, a turn in order of transmission of the second updated data generated by the second application,
      perform at least one of a first changing process, a second changing process, and a third changing process; and
      changes the second priority associated with the second application by performing the at least one of the first changing process, the second changing process, and the third changing process, wherein:
      the first changing process includes changing the second priority associated with the second application, based on a distance between the first window and the second window, and a display area of each of the first window and the second window;
      the second changing process includes changing the second priority associated with the second application, based on a difference between an update time of the first updated data and an update time of the second updated data generated using the second window of the second application; and
      the third changing process includes changing the second priority associated with the second application, based on a relevancy between the first window and the second window.

2. The information processing apparatus of claim 1, wherein
   the processor rearranges a turn in order of transmission of the second updated data generated by the second application, based on the second priority that is stored in the memory in association with the second application and a difference between a transmission processing time and a time at which a transmission request is received.

3. The information processing apparatus of claim 1, wherein
   the processor determines a data amount of transmission of the second updated data generated by the second application, based on the second priority that is stored in the memory in association with the second application.

4. An information sharing system comprising:
   a plurality of information processing apparatuses each including a memory and a processor coupled to the memory, wherein:
   the memory is configured to store a priority with which data is to be transmitted, in association with an application that operates using each of a plurality of windows displayed on the common displaying space; and
   the processor is configured to:
      in response to updating of data executed by each of a plurality of applications, perform transmission and reception of the updated data,
      upon reception of first updated data generated by a first application, change, based on proximity between a first window of the first application and a second window of a second application, a second priority that is stored in association with the second application in the memory, and
      when second updated data is generated by the second application that operates using the second window displayed on the information processing apparatus, determine, based on the changed second priority that is stored in the memory in association with the second application, a turn in order of transmission of the second updated data generated by the second application,
      perform at least one of a first changing process, a second changing process, and a third changing process; and
      changes the second priority associated with the second application by performing the at least one of the first changing process, the second changing process, and the third changing process, wherein:
      the first changing process includes changing the second priority associated with the second application, based on a distance between the first window and the second window, and a display area of each of the first window and the second window;
      the second changing process includes changing the second priority associated with the second application, based on a difference between an update time of the first updated data and an update time of the second updated data generated using the second window of the second application; and
      the third changing process includes changing the second priority associated with the second application, based on a relevancy between the first window and the second window.

5. A synchronous control method performed by a plurality of information processing apparatuses that share a common displaying space, the synchronous control method comprising:
   providing a second information processing apparatus with a memory that stores a priority with which data is to be transmitted, in association with an application which operates using each of a plurality of windows displayed on the common displaying space;
   causing a first information processing apparatus to, in response to updating of data executed by a first application among a plurality of applications that operate using respective windows displayed on the common displaying space, transmit first updated data generated by the first application, to the plurality of information processing apparatuses; and
   causing the second information processing apparatus to:

upon reception of the first updated data, change, based on proximity between a first window of the first application that has generated the first updated data and a second window of a second application, a second priority that is stored in association with the second application in the memory, when second updated data is generated by the second application that operates using the second window displayed on the second information processing apparatus, determine, based on the changed second priority that is stored in the memory in association with the second application, a turn in order of transmission of the second updated data generated by the second application, and transmit the second updated data generated by the second application, based on the determined turn, to the plurality of information processing apparatuses that share the common displaying space, perform at least one of a first changing process, a second changing process, and a third changing process; and changes the second priority associated with the second application by performing the at least one of the first changing process, the second changing process, and the third changing process, wherein:

the first changing process includes changing the second priority associated with the second application, based on a distance between the first window and the second window, and a display area of each of the first window and the second window;

the second changing process includes changing the second priority associated with the second application, based on a difference between an update time of the first updated data and an update time of the second updated data generated using the second window of the second application; and the third changing process includes changing the second priority associated with the second application, based on a relevancy between the first window and the second window.

* * * * *